(12) United States Patent
Doshi et al.

(10) Patent No.: US 11,841,444 B2
(45) Date of Patent: Dec. 12, 2023

(54) RESILIENT EPHEMERIS DECODING OF GNSS SATELLITE INFORMATION

(71) Applicant: SONY CORPORATION, Tokyo (JP)

(72) Inventors: Jignesh Doshi, San Diego, CA (US); Tomohisa Takaoka, Tokyo (JP); Yohei Kajikawa, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 180 days.

(21) Appl. No.: 17/145,783

(22) Filed: Jan. 11, 2021

(65) Prior Publication Data
US 2022/0066050 A1   Mar. 3, 2022

Related U.S. Application Data

(60) Provisional application No. 63/071,247, filed on Aug. 27, 2020.

(51) Int. Cl.
*G01S 19/27*   (2010.01)
*G01S 19/39*   (2010.01)
*G01S 19/20*   (2010.01)

(52) U.S. Cl.
CPC ............ *G01S 19/27* (2013.01); *G01S 19/20* (2013.01); *G01S 19/39* (2013.01)

(58) Field of Classification Search
CPC ......... G01S 19/27; G01S 19/20; G01S 19/243
See application file for complete search history.

(56) References Cited

U.S. PATENT DOCUMENTS

| | | | | |
|---|---|---|---|---|
| 5,375,059 A * | 12/1994 | Kyrtsos | ............... | G01S 19/11 701/470 |
| 5,430,657 A * | 7/1995 | Kyrtsos | ............... | G01S 19/27 342/357.44 |
| 5,991,691 A * | 11/1999 | Johnson | ............... | G01S 19/15 342/357.53 |
| 6,317,662 B1 * | 11/2001 | Li | ............... | G05B 13/04 701/13 |
| 7,839,331 B2 * | 11/2010 | Zhang | ............... | G01S 19/27 342/357.66 |
| 8,120,529 B2 | 2/2012 | Bar-Sever et al. | | |
| 8,186,626 B1 * | 5/2012 | Liu | ............... | B64G 1/242 701/13 |

(Continued)

*Primary Examiner* — Gregory C. Issing
(74) *Attorney, Agent, or Firm* — CHIP LAW GROUP

(57) ABSTRACT

A positioning system and method for resilient ephemeris decoding of Global Navigation Satellite System (GNSS) satellite information is provided. The positioning system decodes first ephemeris data of a satellite in a GNSS satellite constellation and estimates a first position of the satellite at a first time-instant. The positioning system further estimates a deviation between the estimated first position and a position where the satellite is expected to be at the first time-instant and determines the estimated deviation to be above a threshold. The positioning system excludes use of the estimated first position in a position fixing operation of the positioning system based on the determination. The positioning system decodes second ephemeris data of the satellite based on the exclusion, estimates a second position of the satellite at a second time-instant, and controls a position filter of the positioning system to use the estimated second position in the position fixing operation.

15 Claims, 7 Drawing Sheets

(56) References Cited

U.S. PATENT DOCUMENTS

| | | | |
|---|---|---|---|
| 8,391,341 B2 | 3/2013 | Weill | |
| 8,427,365 B2 * | 4/2013 | Dai | G01S 19/44 |
| | | | 701/477 |
| 8,633,852 B2 * | 1/2014 | Bagnall | G01S 19/20 |
| | | | 342/357.44 |
| 8,884,817 B2 | 11/2014 | Seymour | |
| 2005/0234643 A1 * | 10/2005 | Abraham | G01S 19/05 |
| | | | 701/469 |
| 2006/0055598 A1 * | 3/2006 | Garin | G01S 19/258 |
| | | | 342/357.64 |
| 2007/0205942 A1 * | 9/2007 | Xie | G01S 19/27 |
| | | | 342/357.63 |
| 2008/0186229 A1 * | 8/2008 | Van Diggelen | G01S 19/258 |
| | | | 342/357.44 |
| 2015/0362597 A1 * | 12/2015 | Syrjärinne | G01S 19/27 |
| | | | 342/357.58 |
| 2018/0074211 A1 * | 3/2018 | Niesen | G01S 19/426 |

* cited by examiner

RESILIENT EPHEMERIS DECODING OF GNSS SATELLITE INFORMATION

CROSS-REFERENCE TO RELATED APPLICATIONS/INCORPORATION BY REFERENCE

This application claims priority to U.S. Provisional Patent Application Ser. No. 63/071,247 filed on Aug. 27, 2020, the entire content of which is hereby incorporated herein by reference.

FIELD

Various embodiments of the disclosure relate to satellite-based navigation. More specifically, various embodiments of the disclosure relate to a positioning system and method for resilient ephemeris decoding of Global Navigation Satellite System (GNSS) satellite information.

BACKGROUND

Advancements in satellite-based navigation have led to the development of various positioning devices and motion tracking devices that may utilize data transmitted from the satellite vehicles to track the motion of objects in an indoor or an outdoor environment. Typically, in a constellation of satellites for satellite-based navigation, every satellite periodically transmits ephemeris data, which may have to be decoded correctly on a receiver (such as a Global Navigation Satellite System (GNSS) receiver) to find an accurate position fix for the receiver. However, the ephemeris data decoded on such devices may have errors, which may not be easily identified or corrected using parity bits or similar existing mechanisms built into communication protocol. As a result, the position and/or trajectory information of the satellite may be incorrect or may have lower accuracy.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A positioning system and method for resilient ephemeris decoding of Global Navigation Satellite System (GNSS) satellite information is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in a disclosed positioning system and method for resilient ephemeris decoding of Global Navigation Satellite System (GNSS) satellite information. Exemplary aspects of the disclosure provide a positioning system which may provide a resilient method for decoding ephemeris data of a satellite in a GNSS satellite constellation. The positioning system (which may be implemented on, for example, a smartphone, a wearable device, a vehicle, an internet of things (IOT) device, and the like) may be configured to decode the ephemeris data of the satellite and estimate a position of the satellite at a particular time-instant, based on the decoded ephemeris data. The positioning system may be configured to estimate a deviation between the estimated position of the satellite and a position where the satellite may be expected to be at the particular time-instant. When the estimated deviation is above a threshold, the positioning system may be configured to execute a workflow to decide which satellites should be considered in a position fixing operation of the positioning system and whether or not the estimated position of the satellite based on the decoded ephemeris data should be used in the position fixing operation. By executing the workflow, the disclosed positioning system may be able to robustly filter out mis-decoded or anomalous ephemeris data and avoid use of such data in the position fixing operation. This may help to find an accurate and reliable position of the positioning system without having any effect on a navigation or update rate of the positioning system.

Figure 1:
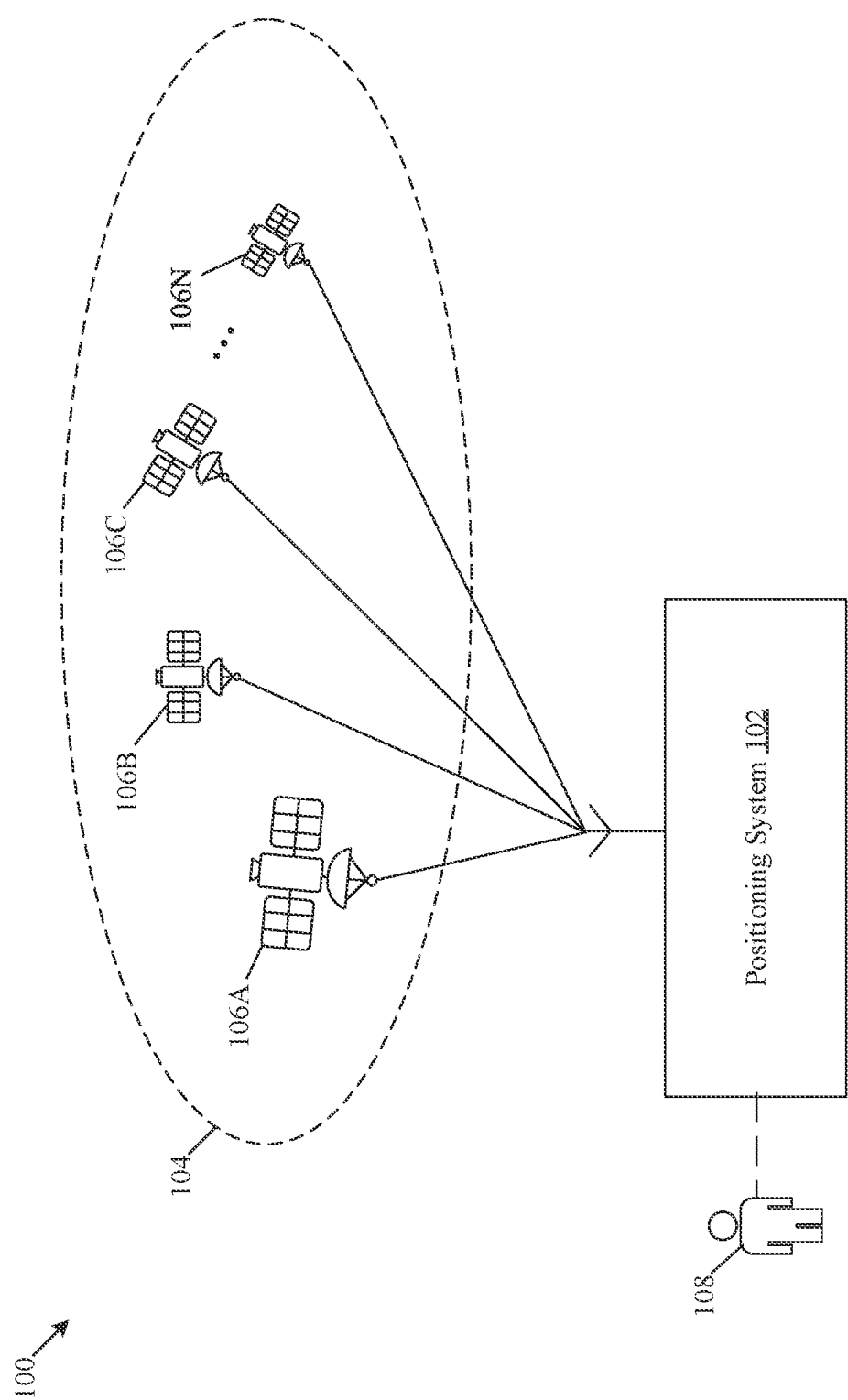
FIG. 1 is a block diagram that illustrates an exemplary environment for resilient ephemeris decoding of Global Navigation Satellite System (GNSS) satellite information, in accordance with an embodiment of the disclosure.

FIG. 1 is a block diagram that illustrates an exemplary environment for resilient ephemeris decoding of Global Navigation Satellite System (GNSS) satellite information, in accordance with an embodiment of the disclosure. With reference to FIG. 1, there is shown a diagram of a network environment 100. The network environment 100 may include a positioning system 102 and a GNSS satellite constellation 104. The GNSS satellite constellation 104 may include a plurality of satellites, such as a satellite 106A, a satellite 106B, a satellite 106C, . . . , and an Nth satellite 106N. The number of satellites in the GNSS satellite constellation 104 in FIG. 1 are presented merely as an example and should not be construed as limiting for the disclosure. In the network environment 100, there is further shown a user 108 who may be associated with the positioning system 102.

The positioning system 102 may include suitable logic, circuitry, code, and/or interfaces that may be configured to receive information, including ephemeris data of various satellites of the GNSS satellite constellation 104 orbiting the earth. The positioning system 102 may individually decode the ephemeris data of each of such satellites to determine a position fix (i.e. device's geographical position) for the positioning system 102. In an embodiment, the positioning system 102 may be implemented as a GNSS receiver chipset, which may be embedded in any device, such as, but not limited to, a smartphone or a mobile phone, a wearable electronic device (such as a smartwatch, smart glasses, or an extended reality (XR) headset), an automotive navigation system, a flight management system, a consumer electronic device, or any electronic device with a capability to integrate a GNSS receiver chipset.

The GNSS satellite constellation 104 may be a group of artificial satellites working together as a system and orbiting the earth in defined orbits and at specific altitudes. Each satellite of the GNSS satellite constellation 104 may periodically broadcast information, such as satellite's ephemeris, satellite's almanac, satellite's health and clock data, and ionospheric data to earth. Such satellites may be controlled and monitored by a network of ground stations on earth. Examples of the GNSS satellite constellation 104 may include, but are not limited to, Global Positioning System (GPS), Global Navigation Satellite System (GLONASS), Indian Regional Navigation Satellite System (IRNSS), Beidou System, and a Galileo System.

In operation, the positioning system 102 may be configured to receive navigation signals from a minimum of four or more satellites of the GNSS satellite constellation 104. The positioning system 102 may segregate the navigation signals from one another in separate channels of a radio frequency (RF) section of the positioning system 102. For each satellite of the GNSS satellite constellation 104, the positioning system 102 may extract ephemeris data (in encoded form) from the navigation signal. Typically, before the ephemeris data is extracted, the navigation signal may be processed through a set of signal processing operations. Such operations are well known to one skilled in the art and therefore, details of such operations are omitted from the disclosure for the sake of brevity.

The ephemeris data typically includes information about the position of a satellite, such as the satellite 106A, relative to the earth at a particular time instant. The accuracy of the ephemeris may deteriorate with time, so the ephemeris data may have to be updated periodically on the positioning system 102 to keep it within the accuracy required to determine correct position fixes for receiver systems (such as the positioning system 102) on earth. The ephemeris data may be unique for each satellite of the GNSS satellite constellation 104.

In a power 'ON' state, the positioning system 102 may periodically acquire and decode the ephemeris data of a satellite (such as the satellite 106A) to determine a position of the satellite relative to the earth. For instance, the positioning system 102 may be configured to decode first ephemeris data of the satellite 106A. Based on the decoded first ephemeris data, the positioning system 102 may be configured to estimate a first position of the satellite 106A. The satellite 106A may be estimated to be at the first position at a first time-instant (represented by T).

The time to acquire and then decode the ephemeris to determine the position of the satellite 106A on the positioning system 102 may typically take about 30-35 seconds. In some instances, the ephemeris data may be decoded, but may have errors, which may not be easily identified or corrected using parity bits or similar mechanism built into the communications protocol. As a result, the position of the satellite at any time-instant may be incorrect, which may be seen as a sudden jump in the position of the positioning system 102. In order to ensure that the positioning system 102 is able to reliably and accurate determine a position fix for itself whenever a jump is detected in the satellite position, the positioning system 102 may implement a workflow, as described herein.

The positioning system 102 may be configured to determine a deviation between the estimated first position of the satellite 106A and a position where the satellite 106A may be expected to be at the first time-instant (T). Here, the positioning system 102 may determine the position where the satellite is expected to be at the first time-instant based on a previous position of the satellite 106A at a previous time-instant ($T_{-x}$, where 'x' may be the time (typically ~30 seconds) it may take to decode an ephemeris from a satellite/prediction and calculate the satellite position).

In order to ascertain if the deviation is indeed a jump in the satellite's position, the positioning system 102 may determine whether the estimated deviation is above a threshold. In case the deviation is determined to be above the threshold, a jump may be detected. In an embodiment, the positioning system 102 may be configured to update a first ephemeris status for the first ephemeris data (for the first time-instant (T)) as a single check. In this case, the first ephemeris data from the satellite 106A may not be used in a position fixing operation until subsequent ephemeris data (for a second time-instant ($T_{+x}$)) is decoded. Specifically, the positioning system 102 may exclude the use of the estimated first position of the satellite 106A in the position fixing operation of the positioning system 102 based on the determination that the deviation is above the threshold.

As the estimated first position (for the first time-instant (T)) may or may not be accurate, the satellite 106A may be tracked and second ephemeris data (for the second time-instant ($T_{+x}$)) may be decoded. The satellite position estimated based on the decoded second ephemeris data may validate whether the estimated first position at the first time-instant (T) is accurate or not. Based on the exclusion, the positioning system 102 may be configured to decode the second ephemeris data of the satellite 106A and may estimate a second position of the satellite 106A at the second time-instant ($T_{+x}$). The second time-instant may succeed the first time-instant.

In an embodiment, the positioning system 102 may update the second ephemeris status for the second ephemeris data as a double check. Based on comparison of both the first ephemeris status and the second ephemeris status, the estimated second position of the satellite 106A may be determined for use in the position fixing operation on the positioning system 102. Accordingly, the positioning system 102 may be configured to control a position filter of the positioning system 102 to use the estimated second position of the satellite 106A in the position fixing operation. In some embodiments, the control of the position filter may include an operation to reset the position filter to use the estimated second position of the satellite 106A in the position fixing operation. While the estimated first position may not be used in the position fixing operation, the state of the position filter (such as a Kalman Filter) may be initialized so that the position filter does not stick to its prediction. This may help in converging to a right trajectory from a wrong trajectory that may have been determined using mis-decoded ephemeris (i.e. the first ephemeris data). Further operations of the positioning system 102 are provided in detail, for example, in FIG. 3 and FIGS. 4A and 4B.

Figure 2:
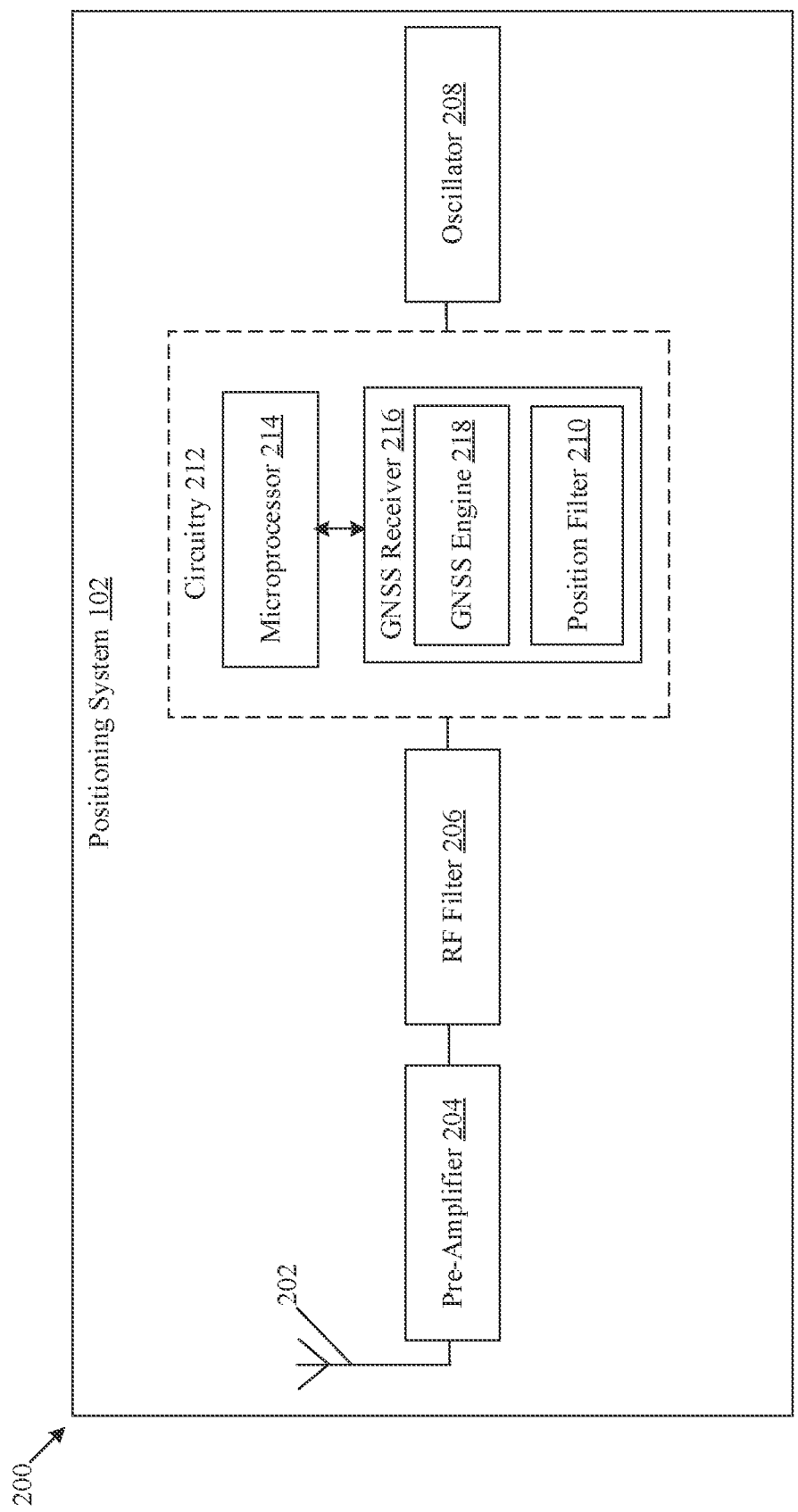
FIG. 2 is a block diagram of the exemplary positioning system of FIG. 1, in accordance with an embodiment of the disclosure.

FIG. 2 is a block diagram of the exemplary positioning system of FIG. 1, in accordance with an embodiment of the disclosure. FIG. 2 is explained in conjunction with elements from FIG. 1. With reference to FIG. 2, there is shown a block diagram 200 of the positioning system 102. The positioning system 102 may include an antenna 202, a pre-amplifier 204, a RF filter 206, an oscillator 208, a position filter 210, and circuitry 212. The circuitry 212 may include a microprocessor 214 and a GNSS receiver 216. The GNSS receiver 216 may include a post-amplifier (not shown), a GNSS engine 218, and the position filter 210.

The antenna 202 may be configured to receive radio frequency (RF) signals from one or more satellites (such as the satellite 106A) of the GNSS satellite constellation 104. Such RF signals may include ephemerides or ephemeris data of such satellites. Examples of the antenna 202 may include, but are not limited to, a quadrifilar antenna, a patch or microstrip antenna, a dipole antenna, a choke ring antenna, a helix antenna, or a planar ring antenna.

The pre-amplifier 204 may be configured to amplify the RF signals received by the antenna 202. As the received RF signals may be weak, the pre-amplifier 204 may be required to increase the power of the received RF signals while ensuring that the gain in power is higher than the noise included in the received RF signals.

The RF filter 206 may be configured to improve a selectivity of the front-end circuit of the positioning system 102. Specifically, the RF filter 206 may reject image frequencies and may block out-of-band interfering signals from the amplified RF signals. Examples of the RF filter 206 may include, but not limited to, Bulk Acoustic Wave (BAW) filter, Surface Acoustic Wave (SAW) filter, or any other RF filter. In case the RF filter 206 is implemented as a SAW filter or a BAW filter, then the RF filter 206 may operate by converting electrical energy into acoustic or mechanical energy on a piezoelectric material.

The oscillator 208 may be configured to provide mechanical resonance of a vibrating crystal, thereby creating electrical signal of a particular frequency. In an embodiment, the oscillator 208 may be a crystal oscillator with a temperature sensitive reactance circuit in order to compensate frequency-temperature characteristics of the crystal. Examples of the oscillator 208 may include, but are not limited to, a temperature compensated crystal oscillator (TCXO), Oven controlled crystal oscillator (OCXO), or any other crystal oscillator.

The position filter 210 may include suitable logic, circuitry, interfaces, and/or code that may be configured to determine a position fix for the positioning system 102 based on estimated positions of at least four satellites of the GNSS satellite constellation. In some instances, the position filter 210 may be implemented as a software component, as something running on the GNSS receiver 216 and may implement Kalman filtering or least-square estimators to determine the position fix.

In some embodiments, the position filter 210 may be controlled or reset to utilize correctly decoded ephemeris. Typically, a position filter is affected by its previous state. If mis-decoded ephemeris is used in previous measurement, then the positioning system 102 may need to be recovered immediately without dragging wrong information, as soon as correct ephemeris is decoded.

The microprocessor 214 may include suitable logic, circuitry, interfaces, and/or code that may be configured to extract and decode the ephemeris data and other information from navigation messages. The microprocessor 214 may be configured to control all components of the GNSS receiver 216. The microprocessor 214 may estimate positions of one or more satellites of the GNSS satellite constellation based on the decoded ephemeris data. In an embodiment, the microprocessor 214 may be configured to execute the position fixing operation of the positioning system 102. Examples of the microprocessor 214 may be an x86-based processor, an x64-based processor, a Reduced Instruction Set Computing (RISC) processor, an Application-Specific Integrated Circuit (ASIC), a Complex Instruction Set Computing (CISC) processor, a field-programmable gate array-based processor, a specialized digital signal processor (DSP), or other processors, and the like.

The GNSS receiver 216 may include suitable logic, circuitry, interfaces, and/or code that may be configured for execute measurement and tracking of positions of the positioning system 102 based on satellite's position, clock information, and other navigation information, which may be received via the RF signals from one or more satellites of the GNSS satellite constellation 104.

The GNSS receiver 216 may have a package configuration and a form factor, which may make it suitable for use with any position tracking device (not shown). Examples of the package configuration may include, but are not limited to, System on Chip (SoC)-based configuration, Field programmable gate arrays (FPGA)-based configuration, complex programmable logic device (CPLD)-based configuration, System in package (SiP)-based configuration, and Programmable System on Chip (PSoC)-based configuration. The GNSS receiver 216 may have a specification that describes data formats, protocols, encryptions, and the like. The specification of the GNSS receiver 216 may vary with a type of the GNSS satellite constellation 104 associated with the GNSS receiver 216.

The GNSS engine 218 of the GNSS receiver 216 may be configured to execute operations of the GNSS receiver 216 on the microprocessor 214. The GNSS engine 218 may include several modules, such as a measurement unit, tracking unit, or a navigation unit. Each of such modules may be implemented as program instructions, specialized circuitry, or a combination thereof.

A person of ordinary skill in the art will understand that the positioning system 102 in FIG. 2 may include other suitable components or systems (for example, analog filters, intermediate frequency (IF) mixers or amplifiers, down-converters, A/D converters, and the like.), in addition to the components or systems which are illustrated herein to describe and explain the function and operation of the present disclosure. A detailed description for the other components or systems of the positioning system 102 has been omitted from the disclosure for the sake of brevity. The operations of the circuitry 212 are further described, for example, in FIG. 3 and FIGS. 4A and 4B.

Figure 3:
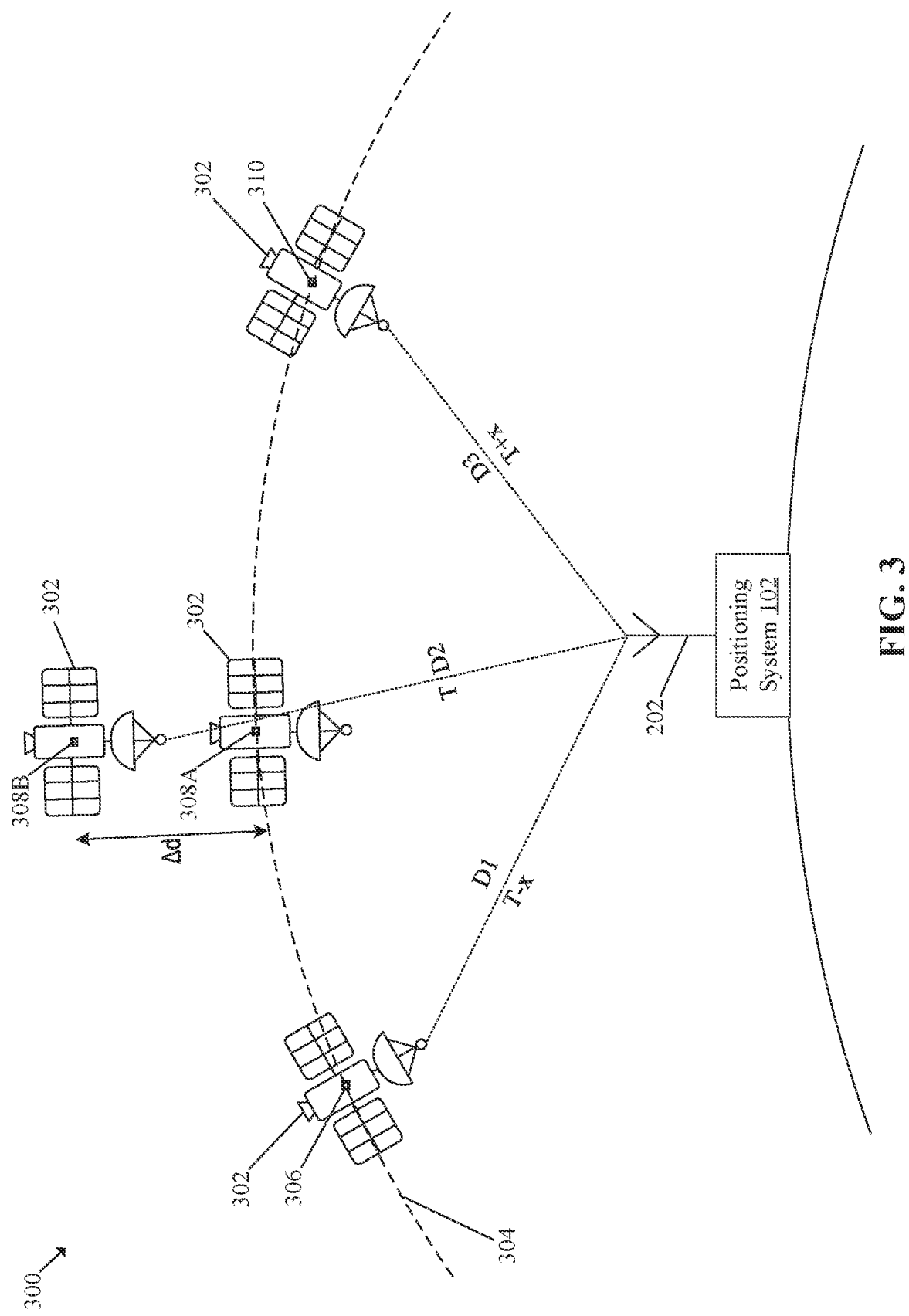
FIG. 3 is a diagram that illustrates an exemplary scenario for a resilient ephemeris decoding in case a jump in satellite's position is detected on the exemplary positioning system of FIG. 1 or FIG. 2, in accordance with an embodiment of the disclosure.

FIG. 3 is a diagram that illustrates an exemplary scenario for a resilient ephemeris decoding in case a jump in satellite's position is detected on the exemplary positioning system of FIG. 1 or FIG. 2, in accordance with an embodiment of the disclosure. FIG. 3 is explained in conjunction with elements from FIGS. 1 and 2. With reference to FIG. 3, there is shown an exemplary scenario 300 which includes a satellite 302 of the GNSS satellite constellation 104 and a trajectory 304 along which the satellite 302 is likely to move. In the scenario 300, the satellite 302 is shown to be at different positions at three successive time-instants $T_{-x}$, T, and $T_{+x}$, where 'x' is the time (typically ~30 seconds) it may take to decode an ephemeris from a satellite/prediction and calculate the satellite position. There is further shown a GNSS receiver system, such as the positioning system 102 on Earth.

The positioning system 102 may be configured to decode ephemeris data ($D_1$) of the satellite 302 and estimate a position 306 of the satellite 302 at a time-instant ($T_{-x}$) based on the decoded ephemeris data ($D_1$). Thereafter, the positioning system 102 may decode ephemeris data ($D_2$) of the satellite 302. When the ephemeris data ($D_2$) is decoded, several positions of the satellite 302 may be determined based on the decoded ephemeris data ($D_1$) and the decoded ephemeris data ($D_2$). For instance, based on the decoded ephemeris data ($D_2$), the positioning system 102 may estimate a position 308B of the satellite 302 at the time-instant (T). Also, based on the position 306 of the satellite 302 at time ($T_{-x}$), it may be possible to identify the trajectory 304 along which the satellite 302 may likely move in space. Thus, the positioning system 102 may determine a position 308A where the satellite 302 may be expected to be at the time-instant (T) based on the position 306 of the satellite 302 at time-instant ($T_{-x}$).

It may be determined whether there is a deviation (represented by Δd) between the position 308A and the position 308B of the satellite 302 at the time-instant (T). In case the deviation is above the threshold, the positioning system 102 may mark an ephemeris status for the ephemeris data ($D_2$) as a single check. When the estimated deviation is above the threshold, the circuitry 212 may be configured to exclude the use of the estimated position 308B of the satellite 302 in a position fixing operation of the positioning system 102. Additionally, an invalid flag for the position 308B of the satellite 302 at the time-instant (T) may be set as true.

If the ephemeris data ($D_2$) is not a predicted ephemeris or an extended ephemeris, the positioning system 102 may continue to decode ephemeris data ($D_3$) and to estimate a position 310 of the satellite 302 at a time-instant ($T_{+x}$). Herein, extended ephemeris may be a form of prediction using previously decoded ephemeris, where expiration of ephemeris is extended beyond 4 hours. Assuming that the likelihood of inaccurately decoding ephemeris data twice for two successive satellite positions is low, the estimated position 310 of the satellite 302 may validate whether the estimated position 308B is correct or not. At this stage, the positioning system 102 may update an ephemeris status for the ephemeris data ($D_3$) as a double check and the invalid flag (which may be previously set as true) may be cleared. The positioning system 102 may control the position filter 210 to use the estimated position 310 of the satellite 302 in the position fixing operation. Exemplary operations for resilient ephemeris decoding are described further, for example, in FIGS. 4A and 4B.

Figure 4A:
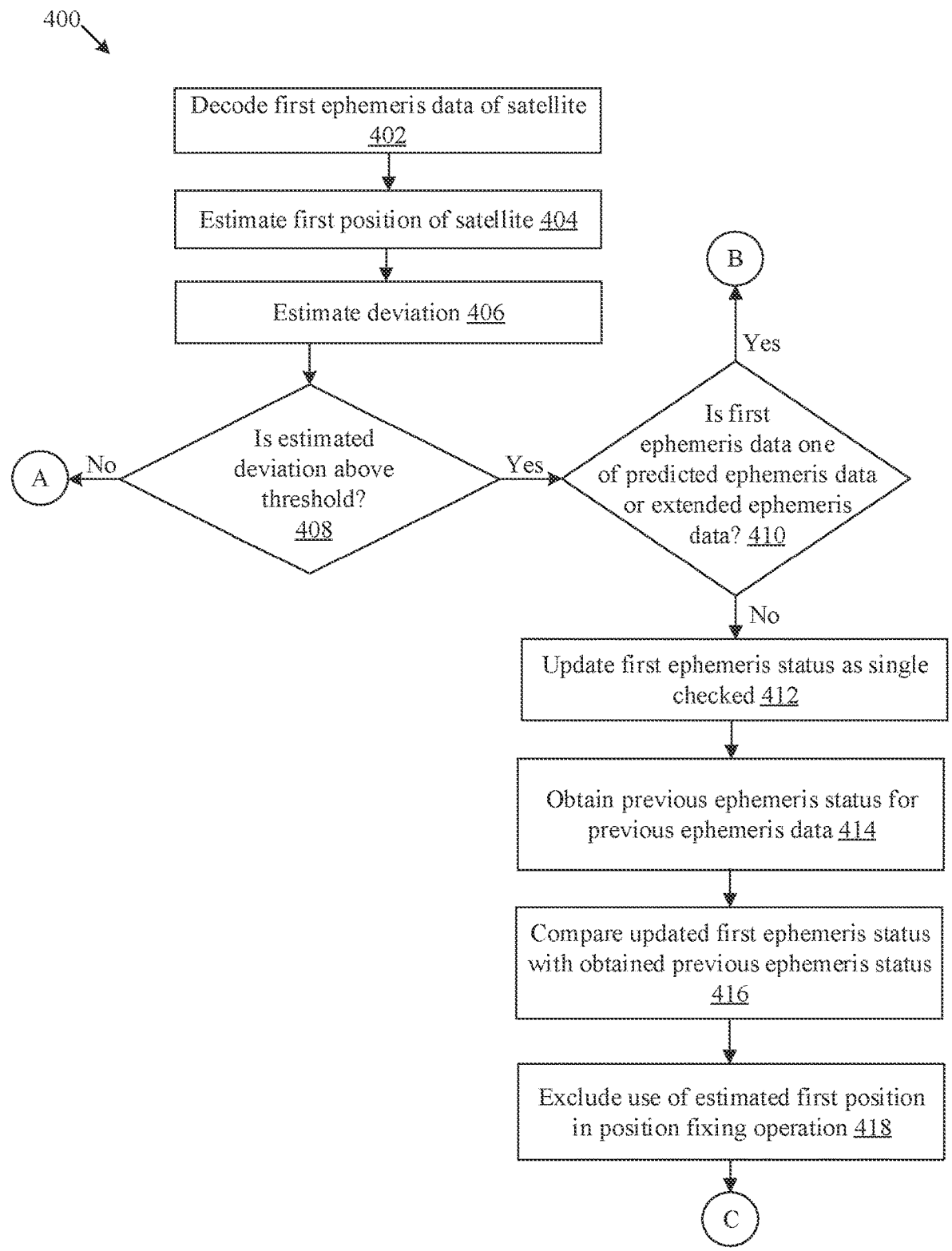
FIGS. 4A and 4B, collectively, depict a flowchart that illustrates exemplary operations that may be performed by the positioning system of FIG. 1 or FIG. 2 for resilient ephemeris decoding of Global Navigation Satellite System (GNSS) satellite information, in accordance with an embodiment of the disclosure.
Figure 4B:
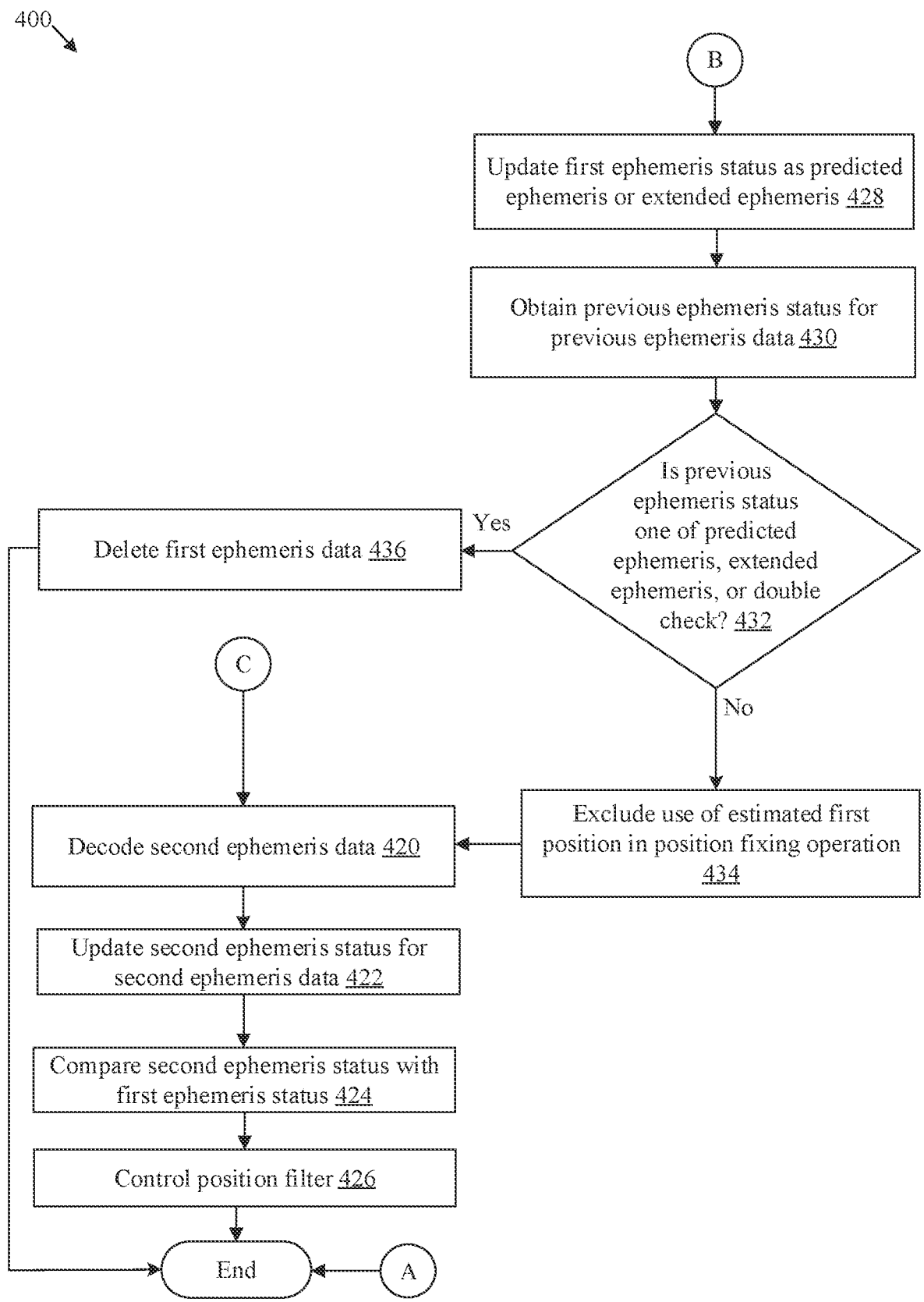

FIGS. 4A and 4B, collectively, depict a flowchart that illustrates exemplary operations that may be performed by the positioning system of FIG. 1 or FIG. 2 for resilient ephemeris decoding of Global Navigation Satellite System (GNSS) satellite information, in accordance with an embodiment of the disclosure. FIGS. 4A and 4B are explained in conjunction with elements from FIGS. 1, 2, and 3. With reference to FIGS. 4A and 4B, there is shown a flowchart 400 that illustrates exemplary operations 402 to 436, as described herein. The exemplary operations illustrated in the flowchart 400 may start at 402 and may be performed by any computing system, apparatus, or device, such as, by the positioning system 102 of FIG. 1 or FIG. 2.

At 402, first ephemeris data of the satellite 302 may be decoded. In an embodiment, the circuitry 212 may be configured to decode the first ephemeris data of the satellite 302 in the GNSS satellite constellation 104. The circuitry 212 may decode the first ephemeris data using a decoder module on the positioning system 102. The decoder module may be a software-defined decoder (such as one in a Software-Defined Receiver (such as GNSS-SDR)), a hardware-based telemetry decoder, or a combination thereof. The implementation of the decoder module on the positioning system 102 may or may not depend on the type of the GNSS satellite constellation 104. Decoding of the ephemeris data is well known to one skilled in the art; therefore, the details of the decoding are omitted from the disclosure for the sake of brevity.

At 404, a first position of the satellite 302 may be estimated. In one or more embodiments, the circuitry 212 may be configured to estimate the first position (such as the position 308B) of the satellite 302 based on the decoded first ephemeris data. The satellite 302 may be estimated to be at the first position (such as the position 308B) at a first time-instant (such as the time-instant (T)).

The decoded first ephemeris data may include information about the satellite's position relative to the earth. For example, the position may be represented in terms of coordinates of the satellite 302 in space. Such coordinates may include orbital terms, such as, but not limited to, a size of the satellite's orbit (i.e. its semimajor axis and shape (i.e. eccentricity of the orbit), an orientation of the orbital plane in space (defined by a right ascension of ascending node and an inclination of its plane), an argument of the perigee and a true anomaly. Such information from at least four satellites of the GNSS satellite constellation 104 may be all that the positioning system 102 may require to determine a position fix for the positioning system 102 on earth at any time instant.

At 406, a deviation (Δd) may be estimated. In an embodiment, the circuitry 212 may be configured to estimate a deviation between the estimated first position (such as the position 308B) of the satellite 302 and a position (such as the position 308A) where the satellite 302 is expected to be at the first time-instant (T). Such deviation may occur due to inaccurate decoding of the first ephemeris data on the positioning system 102.

At 408, it may be determined whether the estimated deviation (Δd) is above a threshold. In an embodiment, the circuitry 212 may be configured to determine whether the estimated deviation is above the threshold (for example, 50 meters or 200 meters). In case the estimated deviation is above the threshold, control may pass to 410. Otherwise, control may pass to end.

At 410, it may be determined whether the first ephemeris data is a predicted ephemeris data or extended ephemeris data. In an embodiment, the circuitry 212 may be configured to determine whether the first ephemeris data is the predicted ephemeris data or the extended ephemeris data. In case the first ephemeris data is determined to be the predicted ephemeris data or the extended ephemeris data, control may pass to 428. Otherwise control may pass to 412.

At 412, a first ephemeris status may be updated as a single check. In an embodiment, the circuitry 212 may be configured to update the first ephemeris status for the first ephemeris data as a single check (or without a double check) based on a determination that estimated deviation is above the threshold. Here, single check may indicate a first measure of accuracy associated with the decoding of the first ephemeris data. Specifically, if the deviation is above the threshold, the single check may indicate that the first position of the satellite 302 (at T) may not be accurate enough to be used in position fixing operation. A double check may have to be performed at time instant ($T_{+x}$) to determine whether the satellite 302 and its broadcast ephemeris data can be used in the position fixing operation or not.

At 414, a previous ephemeris status of previous ephemeris data (such as $D_1$) may be obtained. In one or more embodiments, the circuitry 212 may be configured to obtain a previous ephemeris status for the previous ephemeris data, which may precede the first ephemeris data in time. The previous ephemeris status may be one of a single check for the previous ephemeris data or a double check for the previous ephemeris data. Alternatively, the previous ephemeris status may be one of a predicted ephemeris or an extended ephemeris to indicate that the previous ephemeris data is one of predicted ephemeris data or extended ephemeris data. Herein, the double check may indicate a second measure of accuracy associated with the decoding of the previous ephemeris data. Specifically, the double check may mean that the previous position of the satellite 302 (at $T_{-x}$) may be valid and accurate.

At 416, the updated first ephemeris status (at 412) may be compared with the obtained previous ephemeris status (at 414). In an embodiment, the circuitry 212 may be configured to compare the updated first ephemeris status with the obtained previous ephemeris status.

At 418, the estimated first position (such as the position 308B) of the satellite 302 may be excluded from use in the position fixing operation on the positioning system 102. In an embodiment, the circuitry 212 may be configured to exclude the use of the estimated first position of the satellite 302 in the position fixing operation of the positioning system 102, based on the comparison.

As the updated first ephemeris status may be a single check (or without a double check) and the previous ephemeris status may be one of: a single check (or without a double check), an extended ephemeris, or a predicted ephemeris, the satellite 302 and its broadcast ephemeris data may not be used in the position fixing operation until the ephemeris data of second time-instant ($T_{+x}$) is decoded again.

At 420, second ephemeris data of the satellite 302 may be decoded. In an embodiment, the circuitry 212 may be configured to decode the second ephemeris data of the satellite 302 based on the exclusion (at 418). The circuitry 212 may be configured to estimate the second position (such as the position 310) of the satellite 302 based on the decoded second ephemeris data. The satellite 302 may be estimated to be at the second position at the second time-instant (such as ($T_{+x}$)).

At 422, a second ephemeris status may be updated. In an embodiment, the circuitry 212 may be configured to update the second ephemeris status for the second ephemeris data as a double check. The double check may indicate a second measure of accuracy associated with the decoding of the second ephemeris data. Specifically, the double check may mean that the second position of the satellite 302 (at $T_{+x}$) may be valid and accurate enough to be used in the position fixing operation.

At 424, the updated second ephemeris status (updated at 422) may be compared with the updated first ephemeris status (updated at 412). In an embodiment, the circuitry 212 may be configured to compare the updated second ephemeris status with the updated first ephemeris status.

At 426, the position filter 210 of the positioning system 102 may be controlled. In an embodiment, the circuitry 212 may be configured to control the position filter 210 of the positioning system 102 to use the estimated second position (such as the position 310) of the satellite 302 in the position fixing operation. The second position may be used in the position fixing operation (going forward in time) because If the second position is in agreement with the first position of the satellite 302, then it may be inferred with higher probability that the jump in the first position is correct. If the second position is in a disagreement with the first position, then it may be inferred with higher probability that the jump in the first position is caused by a mis-decoding of ephemeris at time T.

In some instances, the control of the position filter 210 may include an operation to reset a state of the position filter 210 (such as a Kalman filter). While the estimated first position may not be used in the position fixing operation, the state of the position filter 210 (such as a Kalman Filter) may be initialized so that the position filter 210 does not stick to its prediction. This may help in converging to a right trajectory (such as the trajectory 304) from a wrong trajectory that may have been determined using mis-decoded ephemeris (i.e. the first ephemeris data ($D_2$)).

At 428, the first ephemeris status may be updated as one of a predicted ephemeris or an extended ephemeris. In an embodiment, the circuitry 212 may be configured to update the first ephemeris status for the first ephemeris data as one of the predicted ephemeris data. Such an update may be performed based on a determination (at 410) that the first ephemeris data is one of the predicted ephemeris data or the extended ephemeris data.

At 430, a previous ephemeris status for previous ephemeris data (such as $D_1$) may be obtained. In one or more embodiments, the circuitry 212 may be configured to obtain the previous ephemeris status for the previous ephemeris data which may precede the first ephemeris data in time.

At 432, it may be determined whether the previous ephemeris status is one of a predicted ephemeris, an extended ephemeris, or a double check. In an embodiment, the circuitry 212 may be configured to determine whether the previous ephemeris status is one of a predicted ephemeris, an extended ephemeris, or a double check. In case the previous ephemeris status is determined to be one of the predicted ephemeris, the extended ephemeris, or the double check, control may pass to 434. Otherwise, if the previous ephemeris status is a single check (or without a double check), control may pass to 436.

At 434, the first ephemeris data may be deleted. In an embodiment, the circuitry 212 may be configured to compare the updated first ephemeris status with the obtained previous ephemeris status. Based on the comparison, the circuitry 212 may be configured to delete the first ephemeris data. This may be performed when the previous ephemeris status is double checked, but for some reason the previous ephemeris data may have expired (as ephemeris may expire every 4 hours, for example). As the previous ephemeris data may have expired, the first ephemeris data from the satellite 302 may not be available for some 30-35 seconds. In such a case, the positioning system 102 may generate the first ephemeris data as one of the extended ephemeris data or the predicted ephemeris data (which may take less time as compared to the time it may take to decode ephemeris data from the satellite 302). If the estimated first position (such as the position 308B) of the satellite 302 (determined based on the extended ephemeris data or the predicted ephemeris data) deviates from an expected position (such as the position 308A) of the satellite 302 at the first time-instant (T) and the deviation is above a threshold, then the estimated first position may not be reliable enough to be used in the position fixing operation. Therefore, the first ephemeris data may be deleted.

At 436, the estimated first position of the satellite 302 may be excluded from use in the position fixing operation of the positioning system 102. In an embodiment, the circuitry 212 may be configured to exclude the use of the estimated first position of the satellite 302 in the position fixing operation of the positioning system 102 based on the comparison. Control may further pass to 420.

As the previous ephemeris status may be a single check (or without a double check) and the updated first ephemeris status may be one of a predicted ephemeris or extended ephemeris, the first position of the satellite 302 may not be reliable enough to be used in the position fixing operation of the positioning system 102. Therefore, if the deviation associated with the first position is above a threshold, then the satellite 302 and its estimated first position at the first time instant (T) may be excluded from use in the position fixing operation.

Although illustrated with discrete blocks, the exemplary operations associated with one or more blocks of the flowchart 400 may be divided into additional blocks, combined into fewer blocks, or eliminated, depending on implementation of the exemplary operations.

Figure 5:
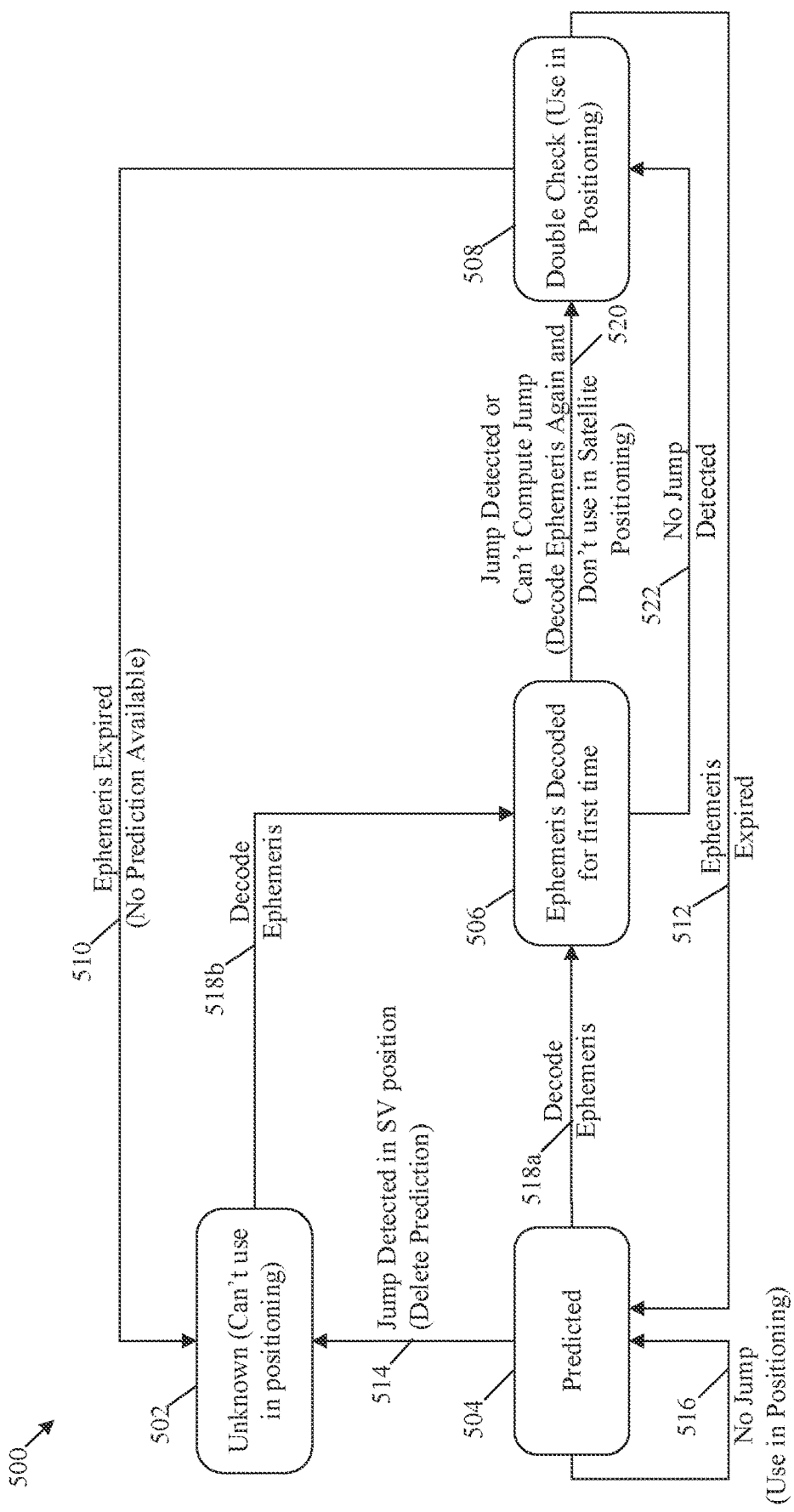
FIG. 5 is an ephemeris state machine diagram that illustrates exemplary operations that may be performed by the positioning system of FIG. 1 or FIG. 2, in accordance with an embodiment of the disclosure.

FIG. 5 is an exemplary ephemeris state machine diagram that illustrates exemplary states and actions that may be performed by the positioning system of FIG. 1 or FIG. 2, in accordance with an embodiment of the disclosure. FIG. 5 is explained in conjunction with elements from FIGS. 1, 2, 3, 4A, and 4B. With reference to FIG. 5, there is shown an ephemeris state machine diagram 500, which represents exemplary states of the positioning system 102. As shown, there are four ephemeris statuses, such as a first ephemeris status 502, a second ephemeris status 504, a third ephemeris status 506, and a fourth ephemeris status 508. The first ephemeris status 502, the second ephemeris status 504, the third ephemeris status 506, and the fourth ephemeris status 508 are represented as unknown, predicted, ephemeris decoded for first time (i.e. a single check), and a double check, respectively.

At any time-instant, the current ephemeris status for ephemeris data (A) may be the first ephemeris status 502 (i.e. unknown). Such status may be based on a determination that previous ephemeris data (B with the fourth ephemeris status 508 as double checked) may have expired. If the ephemeris (B) expires and no prediction is available (as represented by 510), the current ephemeris status may be updated as unknown. In some cases, an extended or predicted ephemeris (P) may be generated when the ephemeris (B) expires (as represented by 512). In such cases, the current ephemeris status (for P) may be updated as predicted (i.e. the second ephemeris status 504).

In some cases, a jump in the satellite position may be detected (as represented by 514). If the jump is detected and if the previous ephemeris is a predicted ephemeris (as represented by the second ephemeris status 504), then the predicted ephemeris may be deleted. Whereas, if no jump is detected and if the previous ephemeris is the predicted ephemeris (as represented by 516), then the predicted ephemeris may be used in the position fixing operation on the positioning system 102.

Whether the current ephemeris status is unknown (i.e. the first ephemeris status 502) or predicted (i.e. the second ephemeris status 504), ephemeris data (C) at a subsequent time-instant may be decoded (represented by 518a-b) on the positioning system 102. In such a case, the current ephemeris status may be updated as single check (or the third ephemeris status 506) for the ephemeris data (C).

If the current ephemeris is single check and a jump in the satellite position is detected for ephemeris data (D at a subsequent time-instant), then the ephemeris data (D) may not be used in the position fixing operation (as represented by 520). In such a case, ephemeris data ((E) at a subsequent time-instant) may be decoded again and the current ephemeris status may be updated as double check (i.e. the fourth ephemeris status 508). At this stage, the ephemeris data (E) may be used in the position fixing operation.

If the current ephemeris is single check and no jump is detected (represented by 522) in the satellite position for ephemeris data (D), then ephemeris data ((E) at a subsequent time-instant) may be decoded again and the current ephemeris status may be updated as double check (i.e. the fourth ephemeris status 508). At this stage, the ephemeris data (E) may be used in the position fixing operation.

Figure 6:
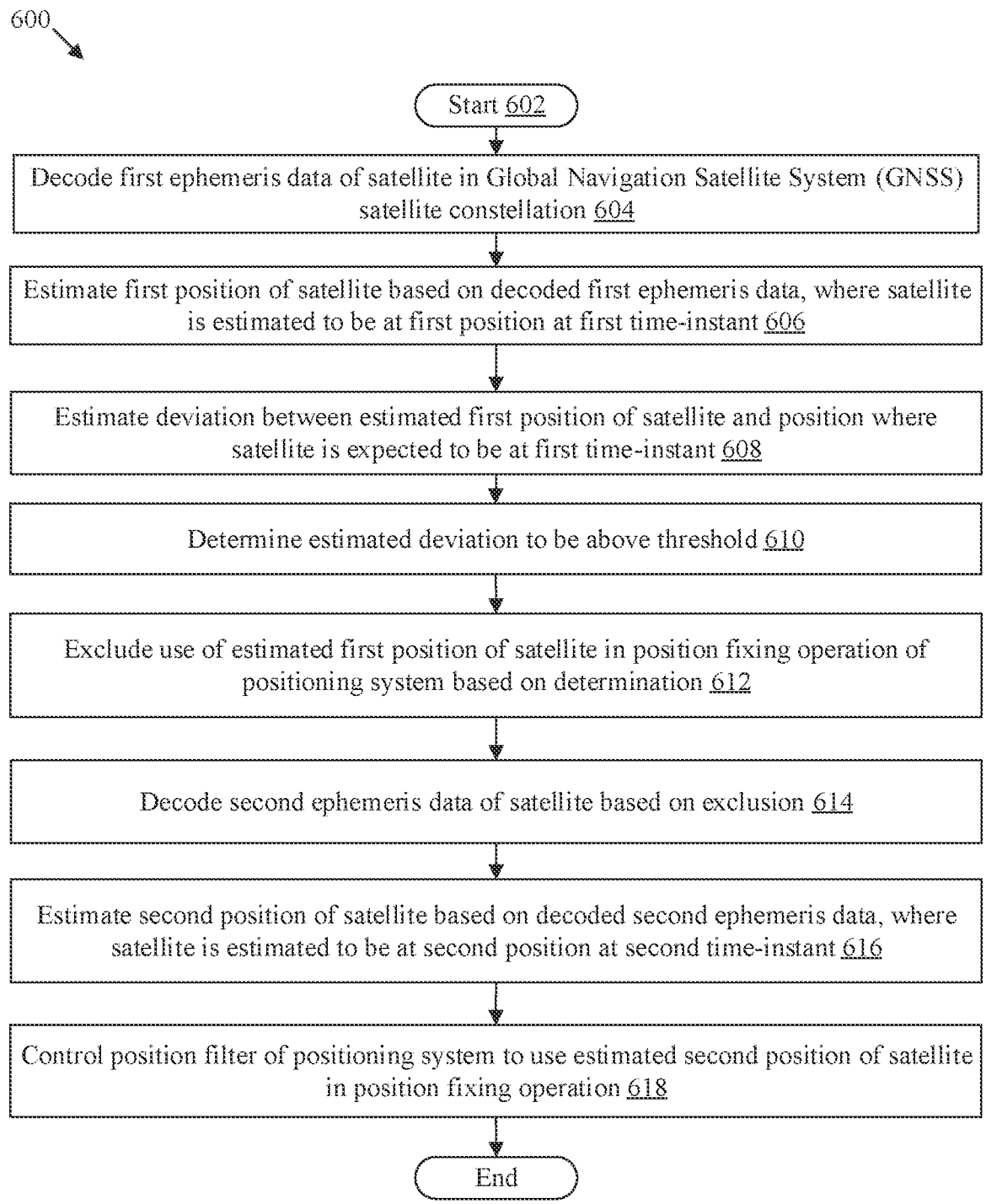
FIG. 6 depicts a flowchart that illustrates an exemplary method for resilient ephemeris decoding of Global Navigation Satellite System (GNSS) satellite information, in accordance with an embodiment of the disclosure.

FIG. 6 depicts a flowchart that illustrates an exemplary method for resilient ephemeris decoding of GNSS satellite information, in accordance with an embodiment of the disclosure. FIG. 6 is explained in conjunction with elements from FIGS. 1, 2, 3, 4A, 4B, and 5. With reference to FIG. 6, there is shown a flowchart 600. The operations of the flowchart 600 may be executed by a computing system, such as the positioning system 102 or the circuitry 212. The operations may start at 602 and proceed to 604.

At 604, first ephemeris data of a satellite (such as the satellite 302) may be decoded. In one or more embodiments, the circuitry 212 may be configured to decode first ephemeris data of the satellite 302 in a Global Navigation Satellite System (GNSS) satellite constellation 104. Details of the decoding of the first ephemeris data of the satellite 302, are described, for example, in FIGS. 3, 4A, and 4B.

At 606, a first position (such as the position 308B) of the satellite 302 may be estimated. In one or more embodiments, the circuitry 212 may be configured to estimate the first position of the satellite 302 based on the decoded first ephemeris data. The satellite 302 may be estimated to be at the first position at a first time-instant (such as the first time-instant 'T'). Details of the estimation of the first position of the satellite 302 are described, for example, in FIGS. 3, 4A, and 4B.

At 608, a deviation may be estimated between the estimated first position (such as the position 308B) of the satellite 302 and a position (such as the position 308A) where the satellite 302 may be expected to be at the first time-instant (T). In one or more embodiments, the circuitry 212 may be configured to estimate the deviation between the estimated first position of the satellite 302 and the position where the satellite 302 may be expected to be at the first time-instant (T). Details of the estimation of the deviation are described, for example, in FIGS. 3, 4A, and 4B.

At 610, the estimated deviation may be determined to be above a threshold. In one or more embodiments, the circuitry 212 may be configured to determine the estimated deviation to be above a threshold, as described, for example, in FIGS. 4A, and 4B.

At 612, the estimated first position (such as the position 308B) of the satellite 302 may be excluded from use in the position fixing operation of the positioning system 102. In one or more embodiments, the circuitry 212 may be configured to exclude the use of the estimated first position (such as the position 308B) of the satellite 302 in the position fixing operation of the positioning system 102 based on the determination, as described, for example, in FIGS. 3, 4A, and 4B.

At 614, second ephemeris data may be decoded. In one or more embodiments, the circuitry 212 may be configured to decode the second ephemeris data of the satellite 302 based on the exclusion, as described, for example, in FIGS. 4A, and 4B.

At 616, a second position (such as the position 310) of the satellite 302 may be estimated. In one or more embodiment, the circuitry 212 may be configured to estimate the second position of the satellite 302 based on the decoded second ephemeris data. The satellite 302 may be estimated to be at the second position at a second time-instant (such as $T_{+x}$). Details of the decoding of the second ephemeris data of the satellite 302 are described, for example, in FIGS. 3, 4A, and 4B.

At 618, a position filter (such as the position filter 210) of the positioning system 102 may be controlled. In one or more embodiments, the circuitry 212 may be configured to control the position filter 210 of the positioning system 102 to use the estimated second position (such as the position 310 of FIG. 3) of the satellite 302 in the position fixing operation. Details of the control of the position filter 210 are described, for example, in FIGS. 3, 4A, and 4B. Control may pass to end.

Although the flowchart 600 is illustrated as discrete operations, such as 504, 606, 608, 610, 612, 614, 616, and 618, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer (for example, the positioning system 102). The computer-executable instructions may cause the machine and/or computer (for example, the positioning system 102) to perform operations that may include decoding of first ephemeris data of a satellite (such as the satellite 302) in a Global Navigation Satellite System (GNSS) satellite constellation (such as the GNSS satellite constellation 104). The operations may further include estimation of a first position (such as the position 308B) of the satellite 302 based on the decoded first ephemeris data. The satellite 302 may be estimated to be at the first position at a first time-instant (such as the first time-instant 'T'). The operations may further include estimation of a deviation between the estimated first position of the satellite 302 and a position (such as the position 308A) where the satellite 302 is expected to be at the first time-instant (T). The operations may further include determination of the estimated deviation to be above a threshold and exclusion of use of the estimated first position of the satellite 302 in a position fixing operation of the positioning system 102 based on the determination. The operations may further include decoding of second ephemeris data of the satellite 302 based on the exclusion and estimation of a second position (such as the position 310) of the satellite 302 based on the decoded second ephemeris data. The satellite 302 may be estimated to be at the second position at a second time-instant (such as the second time-instant '$T_{+x}$'). The operations may further include control of a position filter (such as the position filter 210) of the positioning system 102 to use the estimated second position of the satellite 302 in the position fixing operation.

Exemplary aspects of the disclosure may include a positioning system (such as the positioning system 102) that may include circuitry (such as the circuitry 212). The circuitry 212 may be configured to decode of first ephemeris data of a satellite (such as the satellite 302) in a Global Navigation Satellite System (GNSS) satellite constellation (such as the GNSS satellite constellation 104). The circuitry 212 may be configured to estimate a first position (such as the position 308B) of the satellite 302 based on the decoded first ephemeris data. The satellite 302 may be estimated to be at the first position at a first time-instant (such as the first time-instant 'T'). The circuitry 212 may be configured to estimate a deviation between the estimated first position of the satellite 302 and a position (such as the position 308A) where the satellite 302 may be expected to be at the first time-instant 'T'. The circuitry 212 may be configured to determine the estimated deviation 306 to be above a threshold and exclude use of the estimated first position of the satellite 302 in a position fixing operation of the positioning system 102 based on the determination. The circuitry 212 may be configured to decode second ephemeris data of the satellite 302 based on the exclusion and estimate a second position (such as the position 310) of the satellite 302 based on the decoded second ephemeris data. The satellite 302 may be estimated to be at the second position at a second time-instant (such as the second time-instant '$T_{+x}$'). The circuitry 212 may be configured to control a position filter (such as the position filter 210) of the positioning system 102 to use the estimated second position of the satellite 302 in the position fixing operation.

In accordance with an embodiment, the circuitry 212 may be further configured to determine the position (such as the position 308A) where the satellite 302 is expected to be at the first time-instant (T) based on a previous position of the satellite 302 in space.

In accordance with an embodiment, the circuitry 212 may be further configured to update a first ephemeris status for the first ephemeris data as a single check based on the determination that estimated deviation is above the threshold. The single check may indicate a first measure of accuracy associated with the decoding of the first ephemeris data.

In accordance with an embodiment, the circuitry 212 may be further configured to obtain a previous ephemeris status for previous ephemeris data which precedes the first ephemeris data in time. The circuitry 212 may compare the updated first ephemeris status with the obtained previous ephemeris status. The use of the satellite 302 in the position fixing operation of the positioning system 102 may be excluded further based on the comparison.

In accordance with an embodiment, the circuitry 212 may be further configured to update a second ephemeris status for the second ephemeris data as a double check. The double check may indicate a second measure of accuracy associated with the decoding of the second ephemeris data. The circuitry 212 may be further configured to compare the updated second ephemeris status with the updated first ephemeris status. The position filter 210 may be controlled to use the estimated second position in the position fixing operation based on the comparison In accordance with an embodiment, the first ephemeris data may be predicted ephemeris data or extended ephemeris data. In such as case, the circuitry 212 may be configured to update a first ephemeris status for the first ephemeris data as one of a predicted ephemeris or an extended ephemeris. The first ephemeris status may be updated based on the determination that the estimated deviation is above the threshold and that the first ephemeris data is one of the predicted ephemeris data or the extended ephemeris data.

In accordance with an embodiment, the circuitry 212 may be further configured to obtain a previous ephemeris status for previous ephemeris data which precedes the first ephemeris data in time. The previous ephemeris status may be one of a double check, a predicted ephemeris, or an extended ephemeris. The circuitry 212 may be further configured to compare the updated first ephemeris status with the obtained previous ephemeris status and may delete the first ephemeris data based on the comparison.

In accordance with an embodiment, the circuitry 212 may be further configured to obtain a previous ephemeris status for previous ephemeris data which precedes the first ephemeris data in time. The previous ephemeris status may indicate a single check for the previous ephemeris data. The circuitry 212 may be further configured to compare the updated first ephemeris status with the obtained previous ephemeris status. The use of the satellite 302 in the position fixing operation may be excluded further based on the comparison.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A positioning system, comprising:
at least one processor configured to:
   decode first ephemeris data of a satellite in a Global Navigation Satellite System (GNSS) satellite constellation;
   estimate a first position of the satellite based on the decoded first ephemeris data, wherein
      the satellite is estimated to be at the first position at a first time-instant;
   estimate a deviation between the estimated first position of the satellite and a position where the satellite is expected to be at the first time-instant;
   determine the estimated deviation to be above a threshold;
   obtain a previous ephemeris status of previous ephemeris data of the satellite, wherein
      the previous ephemeris data precedes the first ephemeris data in time, and
      the previous ephemeris status is one of a predicted ephemeris, an extended ephemeris, or a status which indicates that a previous position of the satellite is accurate for a position fixing operation;
   exclude use of the estimated first position of the satellite in the position fixing operation of the positioning system, wherein the use of the estimated first position is excluded based on:
      the determination that the estimated deviation is above the threshold, and
      the obtained previous ephemeris status of the previous ephemeris data;
   decode second ephemeris data of the satellite subsequent to the exclusion of the use of the estimated first position;
   estimate a second position of the satellite based on the decoded second ephemeris data, wherein
      the satellite is estimated to be at the second position at a second time-instant;
   determine one of agreement or disagreement of the estimated second position of the satellite with the first position of the satellite; and
   control, based on one of the determined agreement or disagreement, a position filter of the positioning system to use the estimated second position of the satellite in the position fixing operation.

2. The positioning system according to claim 1, wherein the at least one processor is further configured to determine the position where the satellite is expected to be at the first time-instant based on the previous position of the satellite in space at a previous time-instant that precedes the first time-instant.

3. The positioning system according to claim 1, wherein the at least one processor is further configured to set a first ephemeris status for the first ephemeris data based on the determination that the estimated deviation is above the threshold, wherein
   the first ephemeris status for the first ephemeris data indicates that the first position of the satellite is inaccurate.

4. The positioning system according to claim 3, wherein the at least one processor is further configured to:
   set a second ephemeris status for the second ephemeris data, wherein
      the second ephemeris status indicates that the decoded second position of the satellite is accurate for the position fixing operation; and
   control the position filter, based on the second ephemeris status, to use the estimated second position in the position fixing operation.

5. The positioning system according to claim 1, wherein the first ephemeris data is based on the previous ephemeris data that has expired.

6. The positioning system according to claim 5, wherein the at least one processor is further configured to set a first ephemeris status for the first ephemeris data based on the determination that the estimated deviation is above the threshold and that the first ephemeris data is one of a predicted ephemeris data or an extended ephemeris data.

7. The positioning system according to claim 6, wherein the at least one processor is further configured to delete the first ephemeris data in a case where the previous ephemeris status of the previous ephemeris data indicates that the previous position of the satellite is inaccurate.

8. A method, comprising:
in a positioning system:
decoding first ephemeris data of a satellite in a Global Navigation Satellite System (GNSS) satellite constellation;
estimating a first position of the satellite based on the decoded first ephemeris data, wherein
the satellite is estimated to be at the first position at a first time-instant;
estimating a deviation between the estimated first position of the satellite and a position where the satellite is expected to be at the first time-instant;
determining the estimated deviation to be above a threshold;
obtaining a previous ephemeris status of previous ephemeris data of the satellite, wherein
the previous ephemeris data precedes the first ephemeris data in time, and
the previous ephemeris status is one of a predicted ephemeris, an extended ephemeris, or a status which indicates that a previous position of the satellite is accurate for a position fixing operation;
excluding use of the estimated first position of the satellite in the position fixing operation of the positioning system, wherein the use of the estimated first position is excluded based on:
the determination that the estimated deviation is above the threshold, and
the obtained previous ephemeris status of the previous ephemeris data;
decoding second ephemeris data of the satellite subsequent to the exclusion of the use of the estimated first position;
estimating a second position of the satellite based on the decoded second ephemeris data, wherein
the satellite is estimated to be at the second position at a second time-instant;
determining one of agreement or disagreement of the estimated second position of the satellite with the first position of the satellite; and
controlling, based on the one of determined agreement or disagreement, a position filter of the positioning system to use the estimated second position of the satellite in the position fixing operation.

9. The method according to claim 8, further comprising determining the position where the satellite is expected to be at the first time-instant based on the previous position of the satellite in space at a previous time-instant that precedes the first time-instant.

10. The method according to claim 8, further comprising setting a first ephemeris status for the first ephemeris data based on the determination that estimated deviation is above the threshold, wherein
the first ephemeris status for the first ephemeris data indicates that the first position of the satellite is inaccurate.

11. The method according to claim 10, further comprising:
setting a second ephemeris status for the second ephemeris data, wherein
the second ephemeris status indicates that the decoded second position of the satellite is accurate for the position fixing operation; and
controlling the position filter, based on the second ephemeris status, to use the estimated second position in the position fixing operation.

12. The method according to claim 8, wherein
the first ephemeris data is based on the previous ephemeris data that has expired.

13. The method according to claim 12, further comprising setting a first ephemeris status for the first ephemeris data based on the determination that the estimated deviation is above the threshold and that the first ephemeris data is one of a predicted ephemeris data or an extended ephemeris data.

14. The method according to claim 13, further comprising deleting the first ephemeris data in a case where the previous ephemeris status of the previous ephemeris data indicates that the previous position of the satellite is inaccurate.

15. A non-transitory computer-readable medium having stored thereon, computer-executable instructions which, when executed by a positioning system, causes the positioning system to execute operations, the operations comprising:
decoding first ephemeris data of a satellite in a Global Navigation Satellite System (GNSS) satellite constellation;
estimating a first position of the satellite based on the decoded first ephemeris data, wherein
the satellite is estimated to be at the first position at a first time-instant;
estimating a deviation between the estimated first position of the satellite and a position where the satellite is expected to be at the first time-instant;
determining the estimated deviation to be above a threshold;
obtaining a previous ephemeris status of previous ephemeris data of the satellite, wherein
the previous ephemeris data precedes the first ephemeris data in time, and
the previous ephemeris status is one of a predicted ephemeris, an extended ephemeris, or a status which indicates that a previous position of the satellite is accurate for a position fixing operation;
excluding use of the estimated first position of the satellite in the position fixing operation of the positioning system wherein the use of the estimated first position is excluded based on:
the determination that the estimated deviation is above the threshold, and
the obtained previous ephemeris status of the previous ephemeris data;
decoding second ephemeris data of the satellite subsequent to the exclusion of the use of the estimated first position;
estimating a second position of the satellite based on the decoded second ephemeris data, wherein
the satellite is estimated to be at the second position at a second time-instant;
determining one of agreement or disagreement of the estimated second position of the satellite with the first position of the satellite; and
controlling, based on the one of determined agreement or disagreement, a position filter of the positioning system to use the estimated second position of the satellite in the position fixing operation.

* * * * *